United States Patent [19]

Anson

[11] Patent Number: 5,584,229

[45] Date of Patent: Dec. 17, 1996

[54] REDUCED TEMPERATURE COFFEE BREWER

[75] Inventor: James H. Anson, Auburn, Ill.

[73] Assignee: Bunn-O-Matic Corporation, Springfield, Ill.

[21] Appl. No.: 514,993

[22] Filed: Aug. 14, 1995

[51] Int. Cl.[6] ................................................. A47J 31/00
[52] U.S. Cl. ........................ 99/280; 99/299; 99/307
[58] Field of Search ........................ 99/279, 280, 281, 99/282, 283, 299, 295, 300, 304, 305, 302 R, 307; 426/433

[56] References Cited

U.S. PATENT DOCUMENTS

| | | |
|---|---|---|
| 4,064,795 | 12/1977 | Ackerman . |
| 4,621,571 | 11/1986 | Roberts . |
| 4,809,594 | 3/1989 | Vitous . |
| 4,920,871 | 5/1990 | Anson et al. . |
| 5,025,714 | 6/1991 | Brewer . |
| 5,113,752 | 5/1992 | Brewer . |
| 5,245,914 | 9/1993 | Vitous ................................ 99/280 |
| 5,460,078 | 10/1995 | Weller et al. ....................... 99/295 |

*Primary Examiner*—Robert W. Jenkins
*Attorney, Agent, or Firm*—Trexler, Bushnell, Giangiorgi & Blackstone, Ltd.

[57] ABSTRACT

A beverage brewing appliance for producing a brewed beverage having a serving temperature within a predetermined serving temperature range. The beverage brewing appliance includes a brewing apparatus for infusing a beverage brewing substance retained therein to extract a brewed beverage therefrom. The appliance also includes a first water source having a water heater coupled thereto for delivering water to the brewing apparatus within a predetermined range of brewing temperatures to produce a desired brewed beverage. The brewing appliance also includes a second water source which delivers temperature reduction water to the brewed beverage within a temperature range which, when mixed with the brewed beverage results in a final beverage dispensed from the brewing apparatus within a predetermined serving temperature ranges. The second water source is controlled to deliver a desired quantity of temperature reduction water which will result in the beverage being dispensed within the predetermined range of serving temperatures.

23 Claims, 3 Drawing Sheets

REDUCED TEMPERATURE COFFEE BREWER

BACKGROUND

The present invention relates to beverage brewing apparatus and more specifically to a beverage brewing apparatus, as well as a method for brewing beverages, which produces a brewed beverage within a desired beverage serving temperature range.

Recently, it has been discovered to be desirable to serve brewed beverages at a temperature which is within a serving temperature range which is lower than the temperature at which the beverage is brewed. The serving temperature is an elevated temperature satisfying a number of requirements for brewed beverages but which is lower than a temperature at which a beverage is brewed. Often, it is desirable to brew a beverage using water having a temperature near or below boiling, i.e. 200° F.+5°/−10°. Through substantial effort, the brewing temperature has been arrived at so that the proper flavor of the brewed beverage is achieved by extraction of certain oils, solids and other characteristics from a beverage brewing substance. When a brewing temperature substantially under 200° F. is used, the same characteristics are not extracted from the beverage brewing substance.

It is important to the food service industry that the characteristics and quality of the brewed beverages which they serve to their patrons are maintained at a high quality and consistency. While it is advantageous to serve the brewed beverages at lower temperatures, such lower temperatures would jeopardize the quality, flavor, aroma and other characteristics of the brewed beverage. As such, there is a need to provide a beverage brewing appliance which brews a beverage using brewing water at a brewing temperature and dispenses the beverage into a receptacle at a serving temperature which is lower than the brewing temperature. It should be noted, that while some heat is lost during the brewing process, the heat loss generally is only a few degrees and is not sufficient to lower the temperature to a preferred serving temperature.

A variety of devices have been produced for use in brewing tea. These devices are mentioned herein as background since they employ a brewing appliance which brews a tea concentrate and then dilutes the concentrate. These devices have been designed specifically for use in brewing tea or for brewing coffee or tea using the same device upon making modifications thereto.

U.S. Pat. No. 4,920,871 to Anson et al., U.S. Pat. No. 5,025,714 to Brewer, and U.S. Pat. No. 5,113,752 to Brewer (all assigned to the Assignee of the present invention upon the filing of the present application) shows some form of tea brewing device as mentioned hereinabove. These devices produce a tea concentrate and then introduce water to dilute the tea concentrate. Advantageously, each of the devices employs a double wall brewing funnel. Such a brewing funnel provides an interior chamber for retaining a brewing substance and a passage between the interior chamber and the outer funnel wall for passage of water therethrough. The double walled funnel provides the advantage of dispensing the dilution water used to dilute the tea concentrate and the point at which the tea concentrate is dispensed into a receptacle.

None of the above-referenced devices attempt to produce a brewed beverage having a serving temperature within a predetermined serving temperature range. In each of these devices, the goal is to provide iced tea having a desired dilution without any discussion of moderating the serving temperature.

As such, heretofore, Applicant does not know of any brewing appliances which brew a beverage at a desired brewing temperature and dispense the brewed beverage at a desired serving temperature.

OBJECTS AND SUMMARY

A general object satisfied by the invention is to brew a beverage at a brewing temperature to produce desired beverage brewing characteristics and dispense the beverage for serving at a desired serving temperature.

Another object satisfied by the invention is to provide a beverage brewing appliance which eliminates operator interaction during each brew cycle to achieve a desired serving temperature.

Yet another object satisfied by the invention is to produce a brewed beverage having desired brewed characteristics which are achieved by brewing at a desired brewing temperature yet dispensing the brewed beverage at a serving temperature.

Briefly, and in accordance with the foregoing, the present invention envisions a beverage brewing appliance for producing a brewed beverage having a serving temperature within a predetermined serving temperature range. The beverage brewing appliance includes a brewing apparatus for infusing a beverage brewing substance retained therein to extract a brewed beverage therefrom. The appliance also includes a first water source having a water heater coupled thereto for delivering water to the brewing apparatus within a predetermined range of brewing temperatures to produce a desired brewed beverage. The brewing appliance also includes a second water source which delivers temperature reduction water to the brewed beverage within a temperature range which, when mixed with the brewed beverage results in a final beverage dispensed from the brewing apparatus within a predetermined serving temperature range. The second water source is controlled to deliver a desired quantity of temperature reduction water which will result in the beverage being dispensed within the predetermined range of serving temperatures.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

While the present invention may be susceptible to embodiment in different forms, there is shown in the drawings, and herein will be described in detail, embodiments with the understanding that the present description is to be considered an exemplification of the principles of the invention and is not intended to limit the invention to that as illustrated and described herein.

Figure 1:
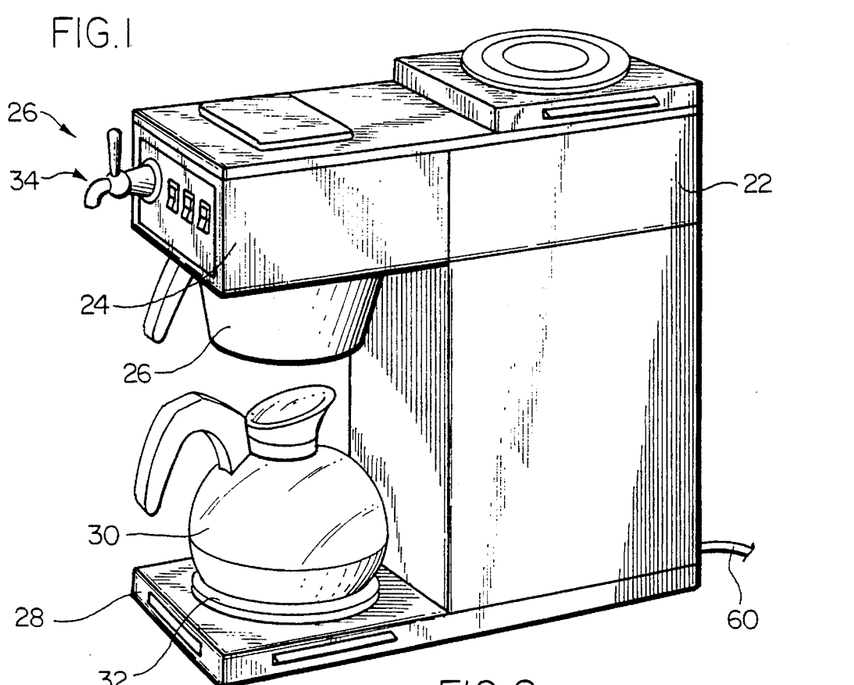
FIG. 1 is a perspective view of a beverage brewing appliance employing the features of the present invention to produce a brewed beverage having a temperature within a predetermined serving temperature range.

A beverage brewing appliance 20 is shown in FIG. 1 which includes a housing or body portion 22, an overhanging section 24 of the body portion, and a brewing funnel 26 retained under the overhanging section 24. A warmer plate section 28 is positioned underneath the overhanging section 24 so that a receptacle 30 may be positioned thereon to collect a brewed beverage dispensed from the brewing funnel 26. The collected brewing substance retained in the receptacle 30 is maintained at a desirable temperature by a warming device 32 of the warmer section 28. A faucet 34 is provided extending from the housing 22 so that heated water may be dispensed for use in a variety of preparations including tea, or instant foods such as soups and cereals.

The beverage brewing appliance 20 as shown in FIG. 1 is shown for purposes of example only and is not intended to limit the invention claimed herein to only the type of device as illustrated. To the contrary, the present invention may be embodied in a number of beverage brewing appliances which may include a number of different housing 22 structures, receptacle 30 structures and may or may not include a faucet 34.

Figure 2:
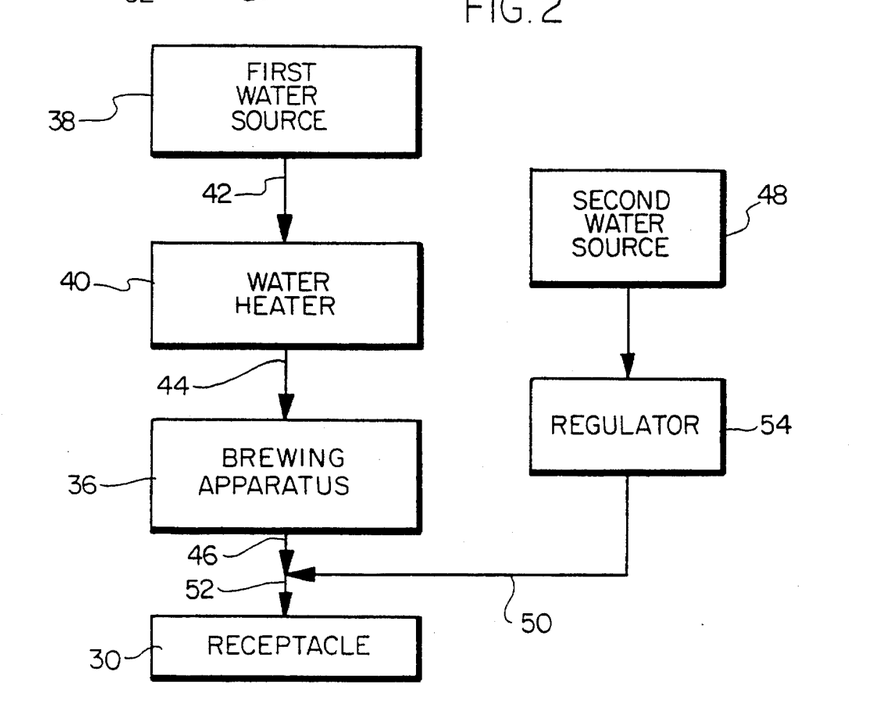
FIG. 2 is a generalized diagrammatic illustration of elements of the invention which produce a desired beverage having a temperature within a predetermined serving temperature range.

A broad general diagrammatic representation of the present invention is shown in FIG. 2. The overall general diagrammatic illustration as shown in FIG. 2 will be elaborated on and more fully described with reference to FIGS. 3 and 4. In order to describe the overall general concept of the invention, however, FIG. 2 is provided and described herein. In FIG. 2, a brewing apparatus 36 is provided for infusing a beverage brewing substance. The beverage brewing substance is retained in the beverage brewing apparatus 36 and infused with water within a desired brewing temperature range, generally 200° F.+5°/–10° F. A first water source 38 is coupled to the brewing apparatus 36 for delivering water thereto. A water heater 40 is coupled to the first water source 38 in order to heat the water from the first water source 38 to the desired brewing temperature. In this regard, the first water source 38 provides water at an initial temperature 42 whereupon the water heater 40 heats the water from the first water source 38 to provide heated water 44 within a desired brewing temperature range. The beverage brewing substance retained in the brewing apparatus 36 is infused with the water 44 within the desired brewing temperature range. The resultant infusion is dispensed from the brewing apparatus 36 as a brewed beverage 46 having a temperature substantially on the order of the brewing water 44.

A second water source 48 is employed to provide temperature reduction water 50 which is mixed with the brewed beverage 46 dispensed from the brewing apparatus 36 to provide a final brewed beverage 52 having a temperature within a predetermined serving temperature range. A regulator 54 is associated with the second water source 48 in order to controllably deliver temperature reduction water 50 which is at least less than the brewing temperature of the water 44 from the first water source 38 so as to produce a reduction in the temperature to produce the final brewed beverage 52 within the desired serving temperature range. The final brewed beverage 52 is dispensed into the receptacle 30 for serving. The present invention may be controlled to produce a final brewed beverage 52 having a final serving temperature of 180° F.–190° F. The present invention also may be controlled to provide beverages having serving temperatures of, for example, 165° F. or lower while still maintaining a consistent high quality brewed beverage having essentially all of the desired characteristics of a beverage served at 200° F. The present invention controllably brews a beverage at an optimum brewing temperature to achieve desired brewed characteristics and serves the beverage at a desired serving temperature.

The present invention, as will be described in further detail hereinbelow, may be embodied in more than one version while achieving substantially the same results. The overall function of the present invention provides a final brewed beverage 52 directly dispensed from the brewing apparatus 36 into a receptacle 30 to prevent unintended tampering or inadvertent alteration which might otherwise change the desired serving temperature range of the final brewed beverage 52. By controlling the quantity and/or temperature of the temperature reduction water 50 mixed with the initial brewed beverage 46, the final brewed beverage 52 will be consistently within a desired serving temperature range. Additionally, the final brewed beverage 52 will provide the expected high quality coffee characteristics since the brewing water 44 will be at a desired brewing temperature thereby extracting the desired levels of flavors, oils, solids, and other components of the brewed beverage.

As an example of the present invention as shown in FIG. 2 and consistent with FIGS. 3 and 4 to be described hereinbelow, the invention is used to brew a brewed beverage at 200° F. yet the beverage which is dispensed into the receptacle will be at approximately 165° F. This example may be represented in mathematical terms such that if "X" represents hot water, "Y" represents temperature reduction water, and 64 ounces of brewed beverage is desired, the equation is:

$$X+Y=64 \text{ oz.}$$

As such, a quantity of hot water, "X", and a quantity of cold water, "Y" is combined to produce 64 ounces of brewed beverage. If a finished beverage (52) is desired to have a serving temperature of 150° F., and the water from the second source 48 has a temperature of 40° F., then:

$$64(165)=X(200)+(64-X)40$$

$$64(165)=X(200)+(64-X)40$$

$$X=50 \text{ oz. and}$$

$$Y=14 \text{ oz.}$$

If a finished beverage 52 is desired to have a serving temperature of 165° F. and the water supplied by the second water source 48 is at 85° F. then:

$$65(165)=X(200)+Y(85)$$

$$64(165)=X(200)+(64-X)(85)$$

X=44.5 oz.

Y=19.5 oz.

As can be seen, the equations can produce a quantity of brewed beverage having a desired temperature in a rather precise manner. In practice, a differentiation of approximately 3 to 5 ounces may occur between the brewing water and the temperature reduction water. This differentiation has a minor effect on the final serving temperature. Additionally, the warming device 32 may be controlled to maintain the desired serving temperature, for example, 165° F., so that the desired temperature range is maintained.

Figure 3:
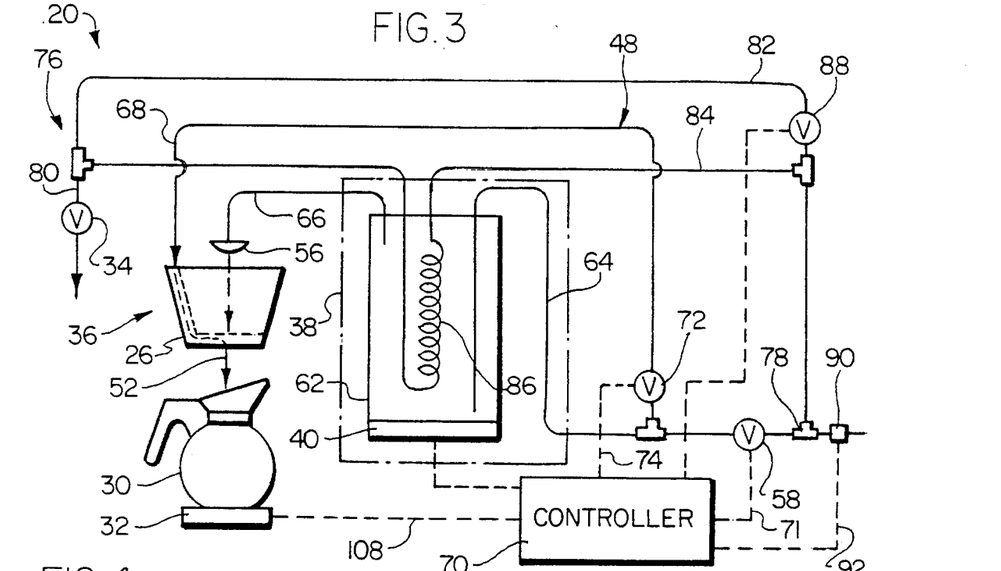
FIG. 3 is a schematic of a first version of the invention employing a single heated water reservoir.

With further reference to FIG. 3, the beverage brewing appliance 20 is shown schematically. The beverage brewing apparatus 36 is generally shown as the brew funnel 26, a spray head 56 coupled to the first water source 38, and a timer controlled solenoid valve 58 coupled to a pressurized feedline 60 which brings water to the beverage brewing appliance 20. The first water source 38 includes a heated reservoir 62 and a first filling line 64 which connects to the feedline 60 to bring water from the feedline 60 to the reservoir 62 and a first delivery line 66. The first delivery line 66 communicates with the heated water reservoir 62 to transport water from the reservoir 62 to the beverage brewing apparatus 36 so that the beverage brewing substance may be infused with water heated within a brewing temperature range.

While a pressurized feedline 60 is shown, it is envisioned that a pourover basin may be associated with the beverage brewing 20 to provide a source of water for the brewing process. The pourover basin will provide essentially the same results as the feedline 60.

The second water source 48 includes a second delivery line 68 which is connected to the feedline 60 to deliver water from the feedline 60 to the beverage brewing apparatus 36 for mixing with a brewed beverage as described hereinabove and in greater detail hereinafter. The control valve 58 connected to the feedline 60 provides a metered quantity of water to the beverage brewing apparatus 36 upon initiation of a beverage brewing cycle. The control valve 58 is controlled by a controller 70 over control line 71. Since both the first feedline 64 and the second delivery line 68 connect to the feedline 60 downstream from the control valve 58 the metered quantity of water will flow into both lines 64, 68 to dispense a desired quantity of water for producing a desired quantity of brewed beverage. A regulator 72 is coupled to the second delivery line 68 so as to regulate how much water passing through the control valve 58 passes through the second delivery line 68. The regulator 72 meters the quantity of water which passes through the second delivery line 68 and thus how much temperature reduction water 50 is added to the brewed beverage 46 to produce the final brewed beverage 52. The regulator 72 is shown as being a controllable solenoid valve connected to the controller 70 over control line 74. It is also envisioned that the regulator 72 may be a manually controllably needle valve which is manually controllable to meter only a desired quantity of water through the second delivery line 68.

An additional advantage of the present invention is that while it is designed to produce a brewed beverage having a serving temperature within a desired serving temperature range, it can also be converted or reverted to a brewing device which produces a brewed beverage solely employing the first water source 38. In this regard, in situations where the serving temperature may not be of concern, the second water source 48 may be turned off thereby requiring all of the water to produce the brewed beverage to come from the first water source 38. In this regard, the regulator 54, when embodied as the automatic solenoid valve, may be controlled by the controller 70 to prevent flow through the second delivery line 68. In the same regard, if the regulator 54 is embodied as the needle valve, the needle valve may be controlled to be shut off to prevent flow of water through the second delivery line 68.

Figure 4:
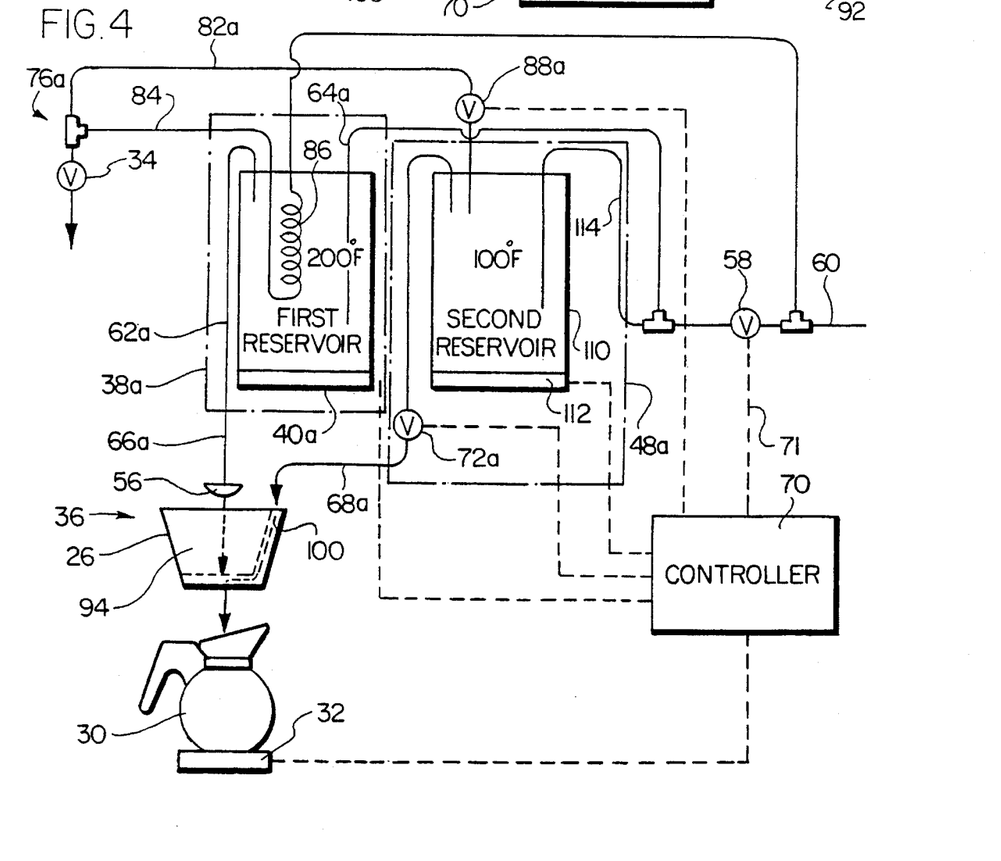
FIG. 4 is a schematic of a second version of the invention employing two heated water reservoirs, heated to different temperatures, used to produce a beverage having a temperature within a desired serving temperature range.

As shown in both FIGS. 3 and 4, a heated water dispenser assembly 76 may be provided with the beverage brewing apparatus 20. The heated water dispenser 76 connects to the faucet 34 and dispenses heated water at a temperature, for example 155° F., which is sufficient to properly prepare instant foods such as soups, cereals and teas. The heated water dispenser water is generally substantially cooler than the 200° F.+5° F./−10° F. temperature of the brewing water.

As shown in FIG. 3, the heated water dispenser assembly 76 connects at one end 78 to the feedline 60 upstream of the solenoid valve 58 and at a second end 80 to the faucet 34. The heated water dispenser assembly 76 includes a reduced temperature line 82 and a heated water line 84. A heat transfer section 86 is coupled to the heated water line 84 and passes through the heated water reservoir 62 in order to heat the water passing through the heated water line 84. A dispenser regulator 88 is coupled to the reduced temperature line 82 and to the controller 70 over line 89 in order to meter a predetermined quantity of water to the faucet 34 in a manner similar to the regulator 72 as discussed hereinabove.

The heated water dispenser 76 provides an essentially closed loop system in order to prevent an depletion of the heated water retained in the heated water reservoir 62. This closed loop configuration helps to assure that the reservoir 62 maintains a desired quantity of heated water for brewing at all times. This prevents a drain of the brewing readiness on the brewing appliance 20 while still providing a source of heated water. In the closed loop, the heat transfer section 86 prevents commingling of the heated water dispenser 76 water with the brewing water retained in the heated reservoir 62. Additionally, water for the heated water dispenser 76 is taken from the feedline 60 independent of the control valve 58. In this manner, water may be dispensed from the heated water dispenser assembly 76 simultaneously with the brewing process having little or no effect on the temperature of the brewing water.

In use, the beverage brewing appliance 20 as shown in FIG. 3 produces a brewed beverage upon initiation of a brewing cycle. When a brewing cycle is initiated the controller 70 operates the control valve 58 over control line 71 to controllably admit a predetermined quantity of water from the pressurized feedline 60 to the first and second water sources 38, 40. The quantity of water is controlled by the controller 70 which includes a brew timer which begins the brew cycle after a start signal, or may incorporate a temperature sensor 90. The temperature sensor 90 is coupled to the feedline 60 and to the controller 70 over control line 92 to sense the temperature of the water passing through the feedline 60. Information regarding the temperature of the water passing through the feedline 60 is used by the controller 70 to control the regulator to 72 via control line 74. The reservoir 62 as shown in FIG. 3 is the "pourover" type such that when water is introduced into the reservoir through the first feedline 64 the water will displace water from the reservoir through the first delivery line 66 and into the brewing apparatus 36. When water is introduced into the reservoir 62, the water heater 40 will be activated in response to a temperature reading to heat the water in the reservoir. It should be noted, that the water heater 40 will also be activated in response to a drop in the temperature of the water in the reservoir 62 when water is passed through the heat transfer section 86 thereby reducing the temperature of the water.

Figure 5:
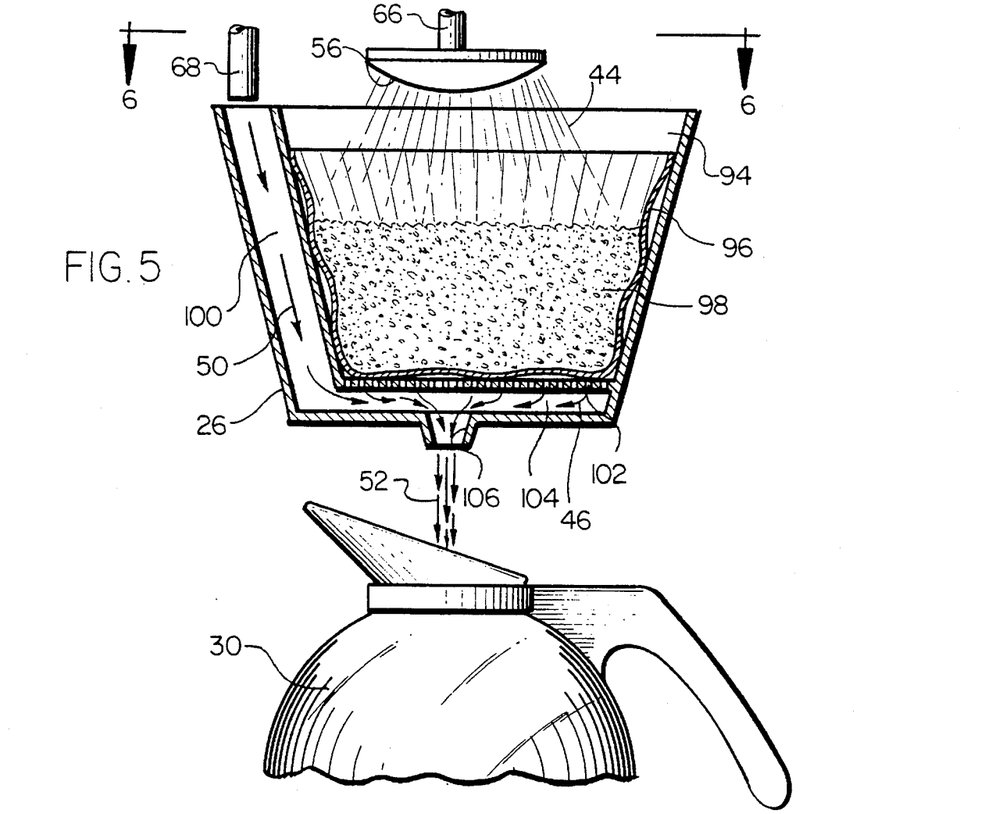
FIG. 5 is a partial fragmentary, cross-sectional, elevational view of a version of a double walled brewing funnel which is used with the present invention to mix temperature reduction water with a brewed beverage to achieve a desired beverage within the predetermined serving temperature range.

Water which is displaced from the reservoir 62 is dispensed through the first delivery line 66 to the funnel 26. With reference to FIG. 5, the funnel 26 includes a primary chamber 94 which retains a filter 96 and a quantity of beverage brewing substance 98. A secondary chamber or passage 100 is provided in the funnel 26 so as to bypass the primary chamber 94 and the grounds which are infused by heated water. Heated water 44 distributed from the sprayhead 56 over the beverage brewing substance 98 is provided at a brewing temperature thereby providing sufficiently heated water to advantageously produced desired brewing effects. In this manner, only heated water passes through the beverage brewing substance. The brewed beverage 46 drains from the primary chamber 94 through the filter 96 and through a foramenous surface 102 towards a bottom the of the primary chamber 94.

Temperature reduction water 50 from the second water source 58 is combined with brewed beverage 46 in a mixing chamber 104 defined between an outlet 106 of the funnel 26 and the intersection of the bypass section 100 with the outfeed from the foramenous structure 102. A brewed beverage 52 having a desired serving temperature is dispensed from the dispensing port 106 into the receptacle 30 therebelow. The controller 70 controllably activates the warmer 32 over control line 108 to maintain the beverage retained in the receptacle 30 at a desired serving temperature. It would be undesirable to raise the temperature of the beverage retained in the receptacle 30 using the warmer and as such the warmer 32 generally maintains the beverage at a temperature equal to or somewhat less than the desired serving temperature.

Figure 6:
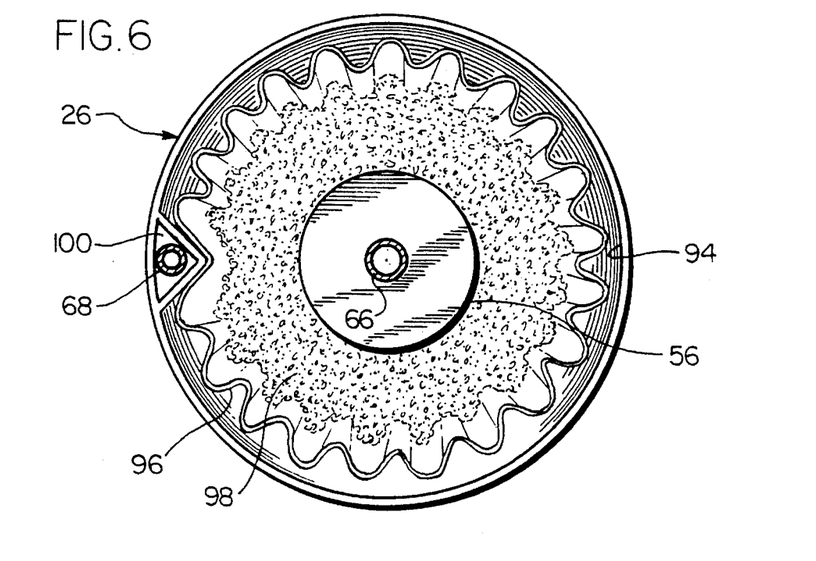
FIG. 6 is a partial fragmentary, cross-sectional, plan view taken along 6—6 in FIG. 5.

Having described the general features of the invention with reference to FIGS. 1 and 2, and the specifics of a first version as shown in FIG. 3, and with further reference to FIGS. 5 and 6, reference is now made to FIG. 4 to further describe a second version of the present invention. Structures or elements which are the same in the second version as shown in FIG. 4 as the first version previously described are represented by the same reference numerals. Structures or components having generally equivalent functions will be described by the same reference numeral with the addition of an alphabetic suffix "a".

With reference to FIG. 4, the first water source 38a includes the heated water reservoir 62a and a heater 40a. A first feedline 64a brings water to the reservoir 62a and a first delivery line 66a provides a path from the reservoir 62a to the beverage brewing apparatus 36. The water heater 40a maintains the water retained in the first reservoir 62a at a temperature of approximately 200° F. +5° F./−10° F. In other words, the first reservoir 62a of the first water source 38a provides the brewing water at the brewing water temperature of approximately 200° in this second version of the invention.

The second water source 48a as shown in FIG. 4 includes a second water reservoir 110 which maintains water therein at a predetermined temperature by means of a water heater 112 which has generally the same configuration as the heater 40a associated with the first reservoir 62a. A second feedline 114 is connected to the main feedline 60 to deliver water from the main feedline 60 to the second reservoir 110. The second delivery line 68a provides a path from the second reservoir 110 to the bypass passage 100 of the brewing funnel 26. A regulator 72a is attached to the second delivery line 68a in order to regulate the quantity of water which is dispensed from the second reservoir 110 to the bypass passage 100 of the brewing funnel 26.

The heated water dispenser assembly 76a employed with the second version of the invention as shown in FIG. 4 includes the heated water line 84 which is coupled to the feedline 60 by way of the heat transfer section 86 and the reduced temperature line 82a which is coupled to the second water source 48a. A regulator 88a is connected to the reduced temperature line 82a to meter the quantity of water which is fed through the reduced temperature line 82a to the faucet 34.

In use, the second version of the invention, consistent with the general diagram as shown in FIG. 2, combines water from a first water source 38a and a second water source 48a to produce a beverage having desired characteristics and a serving temperature within a desired serving temperature range. The temperature sensor 90 as shown in FIG. 3 is absent from FIG. 4 since the temperature of the temperature reduction water from the second water source 48 will be a generally constant temperature having a generally known value. As such, the regulator 72a may be simplified in that the temperature sensor is not required. For a more accurate reading, however, the temperature sensor may be associated with the valve 72a and the controller 70 so as to more precisely meter the quantity of temperature reduction water to the brewing apparatus 36.

In general, the serving temperature of the second version may be more precise or have a smaller deviation range since the temperature of the water from the second water source 48a is more consistent. The water retained in the second reservoir 110 is not subject to temperature fluctuations as may be the version shown in FIG. 3 as the result of the temperature of the water in the feedline 60 may range, for example, range from 40° F.–85° F., which introduces greater variability into the system.

The heated water dispenser assembly 76a as shown in FIG. 4 is not a closed circuit system as discussed with regard to the first version of the invention. Water in the assembly 76a is drawn from the second reservoir 110 through the reduced temperature line 82a. While FIG. 4 shows a preferred second version, yet a further variation of the invention connects the reduced temperature line 82a in the manner as shown in FIG. 3 to provide a true closed loop system. In many circumstances, however, water may be drawn from the second reservoir since the temperature will generally be much lower than the temperature of the water in first reservoir 62. As such, it will take a shorter period of time to heat the water in the second reservoir 110 and therefore require a shorter cycle time to recover the temperature when water is drawn therefrom through the heated water dispenser 76a. The valve 88a meters a quantity of water through the reduced temperature line 82a.

During a brewing cycle, once the brewing cycle is initiated, the valve 58 meters a desired quantity of water from the pressurized feedline 60 to the first and second reservoirs 62a, 110. Water is introduced into the bottom of the reservoirs 62a, 110 so that the heated water which rises towards the top as a result of convection phenomena, will be displaced and dispensed through the first delivery line 66a and the second delivery line 68a. The brewing cycle is generally the same as described hereinabove such that the valve 72a controllably regulates the quantity of water dispensed into the bypass passage 100 of the funnel 26. The difference in the version as shown in FIG. 4 is that the temperature of the water in the second reservoir 110 will be substantially closer to the temperature of the reservoir in the first reservoir 62a compared to the version as shown in FIG. 3 where the water used in the second water source 48 comes directly from the feedline 60, generally at room temperature or cooler.

With reference to FIG. 3, the controller 70 includes a brew timer of known construction which begins a brew cycle after a start signal is received by the controller 70. The brew timer measures a period of time related to the quantity of beverage 52 to be brewed. The controller 70 then calculates the quantity of water which must be dispensed through both the first delivery line 66 and the second delivery line 68. The calculation operates the solenoid valve 58 over line 71 for a predetermined period of time. The controller 70 is preprogrammed to control the solenoid valve 58 to dispense only a required quantity of water. If a controllable solenoid valve 72 is employed on the second feedline 68, the controller may also lo control the solenoid valve 72 over line 74 to open a valve 72 simultaneous with the initiation of the brew cycle or at a predetermined time after the intiation of the brew cycle. In this manner, the temperature reduction water dispensed to the funnel 26 can be delivered simultaneous with the heated water or after a predetermined quantity of heated water to the grounds. A delay of dispensing temperature reduction water to the funnel 26 may be employed to maintain a desired temperature in the brewing water. Additionally, the valve 72 can be adjusted to dispense a desired quantity of water depending on the temperature sensed by the temperature sensor 90 of the water passing through the feedline 60. Generally, at the end of the cycle, the controller 70 controls the valve 58 over line 71 to prevent further dispensing water from the feedline 60. The controller operates the heater 40 over control line 116 to heat and maintain the water in the reservoir 62 at a desired temperature.

With reference to FIG. 4, control valves 58, 72a and 118 can be operated to control the operation and flow of water through the brewing apparatus 36. In this regard, at the beginning of a brew cycle, the solenoid valve 58 must be opened and thus controlled over line 71 by the controller 70 to allow water to flow from the feedline 60 to the first water source 38a and the second water source 48a. The controller 70 can control the valve 72a associated with the second water source 48a independent of the valve 118 associated with the first water source 38a. As such, the temperature reduction water dispensed through the second line 68a may be delayed to allow the heated water delivered through the first line 66a to steep in the beverage brewing substance thereby producing the desired results. This delay may be desired so that the temperature reduction water does not reduce the temperature during the brewing process and does not have any effect on the characteristics on the beverage produced thereby. Alternatively, the valves 72a, 118 may be operated over control lines 74a, 120 by the controller 70 generally simulatenously. The second version as shown in FIG. 4 provides a broad range of controllability to produce precise brewing characteristics and maintain these characteristics consistently over numerous batches of beverage.

As may be evident from the preceding description, the present invention includes a novel method of brewing a beverage in a beverage brewing appliance to produce a beverage having a predetermined serving temperature. The method includes the steps of placing a quantity of brewing substance in the brewing device 36 and dispensing a quantity of brewing water (42) from the first water source 38. The water (42) is heated by a water heater 40 so that the water dispensed to the brewing apparatus is at a brewing temperature (44). The brewing water is used to infuse the beverage brewing substance to produced a desired brewed beverage. Before the brewed beverage is dispensed from the brewing apparatus, a quantity of temperature reduction water is dispensed into the brewed beverage for mixing the temperature reduction water and the brewed beverage to produce a final brewed beverage having a serving temperature within a predetermined temperature range.

While preferred embodiments of the present invention have been shown and described, it is envisioned that those skilled in the art may devise various modifications and equivalents without departing from the spirit and scope of the appended claims. The invention is not intended to be limited by the foregoing disclosure.

The invention claimed is:

1. A beverage brewing appliance for producing a brewed beverage having a serving temperature within a predetermined range of serving temperatures, said beverage brewing appliance comprising:

a brewing apparatus for infusing a beverage brewing substance retained therein to extract a brewed beverage therefrom;

a first water source coupled with said brewing apparatus for delivering water at a brewing temperature within a predetermined range of brewing temperatures to said brewing device for infusing said brewing substance; and a water heater coupled with said first water source for heating said first water source water to said brewing temperature;

a second water source coupled with said beverage brewing appliance for controllably delivering temperature reduction water at a temperature which is at least less than said brewing temperature of the water from said first water source, said temperature reduction water from second water source being mixed with a brewed beverage produced by said brewing apparatus for reducing the temperature of the brewed beverage to said serving temperature prior to serving.

2. A beverage brewing device as recited in claim 1, further comprising a regulator coupled to said second water source for controlling the quantity of temperature reduction water mixed with said brewed beverage to produce a final brewed beverage having a serving temperature within a predetermined serving temperature range.

3. A beverage brewing device as recited in claim 2, wherein said regulator is a manually controllable valve attached to said second water source for controlling the quantity of temperature reduction water mixed with said brewed beverage to produce a final brewed beverage having a serving temperature within a predetermined serving temperature range.

4. A beverage brewing device as recited in claim 2, further comprising a temperature sensor coupled to said feed water line for sensing the temperature of the water received from said feed water line, and wherein said regulator is an automatic control valve attached to said second water source and responsive to said temperature sensor for controlling the quantity of temperature reduction water mixed with said brewed beverage to produce a final brewed beverage having a temperature within a desired serving temperature range.

5. A beverage brewing device as recited in claim 1, further comprising a feed water line connected to said first water source and said second water source, and a control valve attached to said feed water line for controllably dispensing a quantity of water to said first and second water sources.

6. A beverage brewing device as recited in claim 5, further comprising a heated water dispenser coupled to said feed water line, said water dispenser having a heated water line and a reduced temperature line which are combined to provide dispensing water within a desired dispensing temperature range, said heated water line being associated with said first water source and said water heater for heating water in said heated water line to generally said brewing temperature.

7. A beverage brewing device as recited in claim 6, further comprising said first water source having a reservoir and said water heater being coupled to said reservoir for retaining a quantity of water in said reservoir in a heated condition, said heated water dispenser having a heat transfer section in said heated water line associated with said reservoir for heating water in said heated water line to a temperature generally on the order of the temperature of the water retained in said reservoir.

8. A beverage brewing device as recited in claim 5, further comprising:
  a first reservoir of said first water source retaining a quantity of water in a heated condition within a temperature range generally on the order of said brewing temperature;
  a first delivery line communicating with said first reservoir and said brewing apparatus for delivering water from said first reservoir to said brewing apparatus for infusing said brewing substance to produce a brewed beverage;
  a second reservoir of said second water source retaining a quantity of water in a heated condition within a predetermined reduction temperature range;
  a second delivery line communicating with said second reservoir and said brewing apparatus for delivering water from said second reservoir to said brewed beverage produced by said brewing apparatus to reduce the temperature of said brewed beverage from said brewing temperature to said serving temperature.

9. A beverage brewing device as recited in claim 8, further comprising:
  a first water heater being coupled to said first reservoir for maintaining the temperature of the water in said first reservoir within a range generally on the order of said brewing temperature; and
  a second water heater coupled to said second reservoir for maintaining the temperature of the water in said second reservoir within a range generally on the order of said reduction temperature.

10. A beverage brewing device as recited in claim 9, further comprising:
  a controller coupled to said control valve, said regulator, said first water heater, and said second water heater for coordinating control to facilitate production of a brewed beverage within a predetermined serving temperature range.

11. A beverage brewing device as recited in claim 8, further comprising a regulator coupled to said second delivery line for controlling the quantity of temperature reduction water dispensed from said second reservoir for mixing with said brewed beverage to produce a final brewed beverage having a serving temperature within a predetermined serving temperature range.

12. A beverage brewing device as recited in claim 11, wherein said regulator is a manually controllable valve attached to said second delivery line for manually controlling the quantity of temperature reduction water mixed with said brewed beverage to produce a final brewed beverage having a serving temperature within a predetermined serving temperature range.

13. A beverage brewing device as recited in claim 11, wherein said regulator is an automatic control valve attached to said second delivery line automatically controlling the quantity of temperature reduction water dispensed from said second reservoir for mixing with said brewed beverage to produce a final brewed beverage having a serving temperature within a desired serving temperature range.

14. A beverage brewing device as recited in claims 8, further comprising:
  a heated water dispenser coupled to said feed water line and dispensing heated water within a predetermined dispensing water temperature range;
  said heated water dispenser having a heated water line and a reduced temperature line which are combined to provide water within said dispensing water temperature range;
  said heated water line being associated with said first water source and said first water heater for heating water in said heated water line to generally said brewing temperature; and
  said reduced temperature line being coupled to said second water source for providing water from said dispenser having a dispensing temperature generally between said brewing temperature and said reduced temperature.

15. A beverage brewing device as recited in claim 14, further comprising said heated water dispenser having a heat transfer section in said heated water line disposed in said first reservoir for heating water in said heated water line to a temperature generally on the order of the temperature of the water retained in said first reservoir.

16. A beverage brewing appliance for producing a brewed beverage having a predetermined temperature, said beverage brewing appliance comprising:
  a brewing apparatus for infusing a beverage brewing substance to extract a brewed beverage therefrom;
  a first water source having a reservoir and a first delivery line communicating with said first reservoir and said brewing apparatus, said first water source retaining a quantity of water in said reservoir in a heated condition and delivering water through said first delivery line to said brewing device at a brewing temperature for infusing said brewing substance;
  a water heater coupled with said first water source for heating said first water source water to said brewing temperature;
  a second water source associated with said beverage brewing appliance for controllably providing temperature reduction water at a temperature which is less than the brew water from said first water source, said temperature reduction water from second water source being mixed with a brewed beverage produced by said brewing apparatus for reducing the temperature of the brewed beverage prior to serving;
  a feed water line connected to said first water source and said second water source;
  a control valve attached to said feed water line for controllably dispensing a quantity of water to said first and second water sources; and
  a regulator coupled to said second water source for controlling the quantity of temperature reduction water mixed with said brewed beverage to produce a final brewed beverage having a temperature within a desired temperature range.

17. A beverage brewing device as recited in claim 16, further comprising a temperature sensor coupled to said feed water line for sensing the temperature of the water received from said feed water line, and wherein said regulator is an automatic control valve attached to said second water source and responsive to said temperature sensor for controlling the quantity of temperature reduction water mixed with said brewed beverage to produce a final brewed beverage having a temperature within a desired temperature range.

18. A beverage brewing device as recited in claim 17, further comprising:

a controller coupled to said control valve, said regulator, said first water heater, and said temperature sensor for coordinating control of said brewing apparatus to facilitate production of a brewed beverage within a predetermined serving temperature range.

19. A beverage brewing device as recited in claims 16, further comprising:

a heated water dispenser coupled to said feed water line and dispensing heated water within a predetermined dispensing water temperature range;

said heated water dispenser having a heated water line and a reduced temperature line which are combined to provide water within said dispensing water temperature range;

said heated water line being coupled to said first water source and said first water heater for heating water in said heated water line to generally said brewing temperature; and said reduced temperature line being coupled to said second water source for providing water from said dispenser having a dispensing temperature generally between said brewing temperature and said reduced temperature.

20. A beverage brewing device as recited in claim 19, further comprising said heated water dispenser having a heat transfer section in said heated water line associated with said first reservoir for heating water in said heated water line to a temperature generally on the order of the temperature of the water retained in said reservoir.

21. A beverage brewing appliance for producing a brewed beverage having a predetermined temperature, said beverage brewing appliance comprising:

a brewing apparatus for infusing a beverage brewing substance to extract a brewed beverage therefrom;

a first water source having a first reservoir and a first delivery line communicating with said first reservoir and said brewing apparatus, said first water source retaining a quantity of water in said first reservoir in a heated condition and delivering water through said first delivery line to said brewing apparatus at a brewing temperature for infusing said brewing substance;

a second water source having a second reservoir and a second delivery line communicating with said second reservoir and said brewing device, said second reservoir retaining a quantity of water in a heated condition and delivering water through said second delivery line to said brewing device for controllably providing temperature reduction water at a temperature which is less than the brew water from said first water source, said temperature reduction water from second water source being mixed with a brewed beverage produced by said brewing device for reducing the temperature of the brewed beverage prior to serving;

a second water heater coupled with said second water source for heating water retained in said second water source water to said temperature reduction temperature;

a feed water line connected to said first water source and said second water source;

a control valve attached to said feed water line for controllably dispensing a quantity of water to said first and second water sources; and a regulator coupled to said second water source for controlling the quantity of temperature reduction water mixed with said brewed beverage to produce a final brewed beverage having a temperature within a desired temperature range.

22. A beverage brewing device as recited in claim 21, further comprising:

a controller coupled to said control valve, said regulator, said first water heater, and said second water heater for coordinating control of said brewing apparatus to facilitate production of a brewed beverage within a predetermined serving temperature range.

23. A beverage brewing device as recited in claims 21, further comprising:

a heated water dispenser coupled to said feed water line and dispensing heated water within a predetermined dispensing water temperature range;

said heated water dispenser having a heated water line and a reduced temperature line which are combined to provide water within said dispensing water temperature range;

a heat transfer section in said heated water line associated with said first reservoir for heating water in said heated water line to a temperature generally on the order of the temperature of the water retained in said reservoir;

said reduced temperature line being coupled to said second water source for providing water from said dispenser having a dispensing temperature generally between said brewing temperature and said reduced temperature.

\* \* \* \* \*

UNITED STATES PATENT AND TRADEMARK OFFICE
CERTIFICATE OF CORRECTION

PATENT NO. : 5,584,229
DATED      : December 17, 1996
INVENTOR(S) : James H. Anson It is certified that error appears in the above-indentified patent and that said Letters Patent is hereby corrected as shown below:

Column 4, Line 55 "64(165)= X(200)+(64-X)40" should be
--64(165)=X(200)+Y(40) --

Column 9, Line 15 "also lo control" should be -- also control --

Signed and Sealed this

Eighth Day of April, 1997

*Attest:*

BRUCE LEHMAN

*Attesting Officer*  *Commissioner of Patents and Trademarks*